(12) United States Patent
Garau

(10) Patent No.: US 8,201,383 B2
(45) Date of Patent: Jun. 19, 2012

(54) BEAM FOR A CO-ORDINATE MEASURING MACHINE, METHOD FOR ITS PRODUCTION, AND MEASURING MACHINE PROVIDED WITH SAID BEAM

(75) Inventor: Enrico Garau, Turin (IT)

(73) Assignee: Hexagon Metrology S.p.A., Moncalieri (IT)

(*) Notice: Subject to any disclaimer, the term of this patent is extended or adjusted under 35 U.S.C. 154(b) by 261 days.

(21) Appl. No.: 12/513,801

(22) PCT Filed: Nov. 9, 2007

(86) PCT No.: PCT/IB2007/003425
§ 371 (c)(1),
(2), (4) Date: Sep. 22, 2009

(87) PCT Pub. No.: WO2008/056244
PCT Pub. Date: May 15, 2008

(65) Prior Publication Data
US 2010/0018153 A1   Jan. 28, 2010

(30) Foreign Application Priority Data

Nov. 10, 2006 (IT) ................ TO2006A0803

(51) Int. Cl.
*E04C 3/00* (2006.01)

(52) U.S. Cl. ............................. 52/831; 52/836; 33/503
(58) Field of Classification Search ................ 52/831, 52/836; 33/503
See application file for complete search history.

(56) References Cited

U.S. PATENT DOCUMENTS

| 2,516,020 | A | * | 7/1950 | Reed .............................. 29/897 |
| 4,602,465 | A | * | 7/1986 | Peschl ............................ 52/245 |
| 5,388,343 | A | * | 2/1995 | Garau et al. .................... 33/503 |
| 6,050,048 | A |   | 4/2000 | Hellsten |
| 6,161,298 | A | * | 12/2000 | Bernhardt et al. ............. 33/702 |
| 6,202,316 | B1 | * | 3/2001 | Swift et al. ..................... 33/503 |
| 6,834,471 | B2 | * | 12/2004 | Takagi et al. ................... 52/699 |
| 7,036,237 | B2 | * | 5/2006 | Ogura et al. .................... 33/503 |
| 2004/0250503 | A1 |   | 12/2004 | Bigelow |

FOREIGN PATENT DOCUMENTS

EP   0 957 332 A2   11/1999
FR   1.397.480   3/1965

* cited by examiner

*Primary Examiner* — Basil Katcheves
*Assistant Examiner* — Beth Stephan
(74) *Attorney, Agent, or Firm* — Leason Ellis LLP

(57) ABSTRACT

A beam for a measuring machine is constituted by a plurality of extruded beam elements, which are set alongside one another and welded together so that each forms a portion of the cross section of the beam itself; the beam elements and the beam have a hollow section shaped like an equilateral triangle.

5 Claims, 2 Drawing Sheets

BEAM FOR A CO-ORDINATE MEASURING MACHINE, METHOD FOR ITS PRODUCTION, AND MEASURING MACHINE PROVIDED WITH SAID BEAM

TECHNICAL FIELD

The present invention relates to a beam for a co-ordinate measuring machine, as well as to a method for its production and to a measuring machine provided with said beam.

The present invention finds a particularly advantageous, albeit not exclusive, application in co-ordinate measuring machines of large dimensions of the type with pillars, to which reference will be made in what follows by way of example, for greater clarity, without this implying any loss of generality.

BACKGROUND ART

Known to the art are pillar measuring machines comprising a pair of lateral supporting structures, each constituted by a plurality of vertical pillars aligned with respect to one another and by a top horizontal fixed beam supported by the pillars. The fixed beams of the two supporting structures are parallel to one another and to a first co-ordinate axis of the machine. The machine moreover comprises a mobile beam, horizontal and transverse to the fixed beams, which is supported thereby and can slide in the direction of the first axis along guides made on the same fixed beams. The mobile beam in turn comprises a plurality of guides set along a longitudinal axis thereof orthogonal to the first axis and constituting a second axis of the machine. A carriage, carried by the mobile beam, is mobile on the guides of the mobile beam along the second axis. Finally, a column measuring head is carried by the carriage and is mobile with respect to this vertically along a third axis of the machine. The measuring head is designed to be equipped, at its bottom end, with a detector device of the contact or remote type.

In the measuring machines of the type described, the mobile beam is generally of considerable dimensions, with a length in the region of 3-4 meters and a cross section with dimensions in the region of 0.6 meters or more, in order to bestow the maximum possible rigidity thereon. To keep the mass of the beam within acceptable limits, said beam is made of a light alloy, for example an aluminium alloy. However, the dimensions of the cross section are such as not to enable use of conventional extrusion techniques. The beam must thus be obtained by casting, which entails high production costs for a twofold reason. In the first place, the process of casting in itself is more costly than extrusion; in the second place, the metallurgical properties of a rough beam obtained by means of casting are such as not to enable construction of the slide guides for the carriage directly on the rough beam via operations of machining (micromilling) and surface hardening. It is, instead, necessary to make a local deposition of material with appropriate characteristics, and subsequently carry out the mechanical finishing, and the guides can be made on the beam itself without entailing costly operations of deposition of material.

DISCLOSURE OF INVENTION

The aim of the present invention is to provide a beam for a measuring machine that will enable solution of the problems connected to the prior state of the art and discussed above.

The aforesaid purpose is achieved by the present invention, in so far as it relates to a beam for a measuring machine, characterized in that it comprises a plurality of beam elements, each forming, in cross section, a part of the cross section of said beam, said beam elements being set alongside one another and welded together so as to form as a whole said beam.

In this way, even though the overall dimensions of the beam are such as to prevent production thereof by extrusion in a single piece, the elements that make up the beam can be extruded. The cost of the beam is consequently contained as compared to the monolithic beams obtained by casting according to the known art.

According to a preferred embodiment of the invention, the elements have a hollow cross section and are the same as one another.

In particular, the section of the beam and of the individual elements is preferably shaped like an equilateral triangle.

According to a further preferred characteristic of the invention, the elements are connected to one another by continuous and through welds.

The present invention moreover relates to a method for the production of a beam for a measuring machine, characterized in that it comprises the steps of:

making a plurality of beam elements by means of extrusion, each of said beam elements having a cross section equal to a part of the cross section of said beam; and setting alongside one another and welding together said beam elements so as to form said beam.

BRIEF DESCRIPTION OF THE DRAWINGS

For a better understanding of the present invention, a preferred embodiment is described in what follows, by way of non-limiting example and with reference to the attached plate of drawings, in which.

BEST MODE FOR CARRYING OUT THE INVENTION

Figure 1:
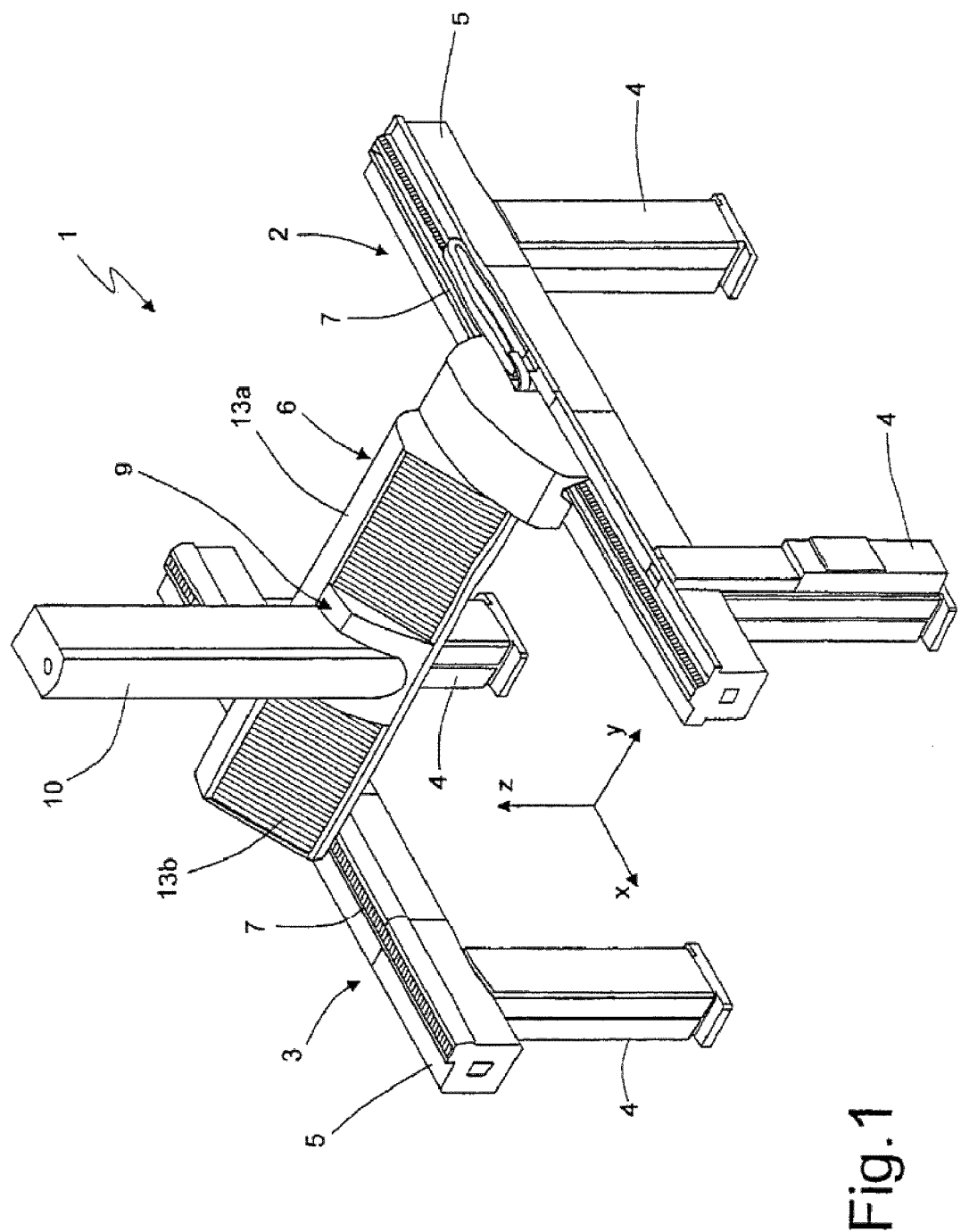
FIG. 1 is a schematic perspective view of a measuring machine provided with a beam built according to the present invention.

With reference to FIG. 1, designated by 1 is a pillar measuring machine comprising a pair of lateral supporting structures 2, 3, each constituted by a plurality of vertical pillars 4 aligned to one another (in the example illustrated, only two) and by a top horizontal fixed beam 5 supported by the pillars 4. The fixed beams 5 of the two supporting structures 2, 3 are parallel to one another and to a first co-ordinate axis X of the machine 1. The machine 1 moreover comprises a horizontal cross member 6 transverse to the fixed beams 5, which is supported thereby and can slide in the direction of the first axis X on guides 7 made on the fixed beams 5 themselves. The cross member 6 comprises a mobile beam 12, hereinafter defined simply as "beam 12", illustrated in sectional view in FIG. 2 but not visible clearly in FIG. 1 in so far as it is provided with guards 13a, 13b of a conventional type. The beam 12 in turn defines a plurality of guides 8 (FIG. 2) parallel to a longitudinal axis thereof, orthogonal to the first axis and constituting a second axis Y of the machine.

A carriage 9, carried by the beam 12, is mobile along the guides 8 along the second axis Y. Finally, a column measuring head 10 is carried by the carriage 9 and is mobile with respect to this vertically along a third axis Z of the machine. The measuring head 10 is designed to be equipped, at its bottom end (not illustrated), with a detector device 11 in contact therewith or at a distance therefrom (not illustrated either).

Figure 2:
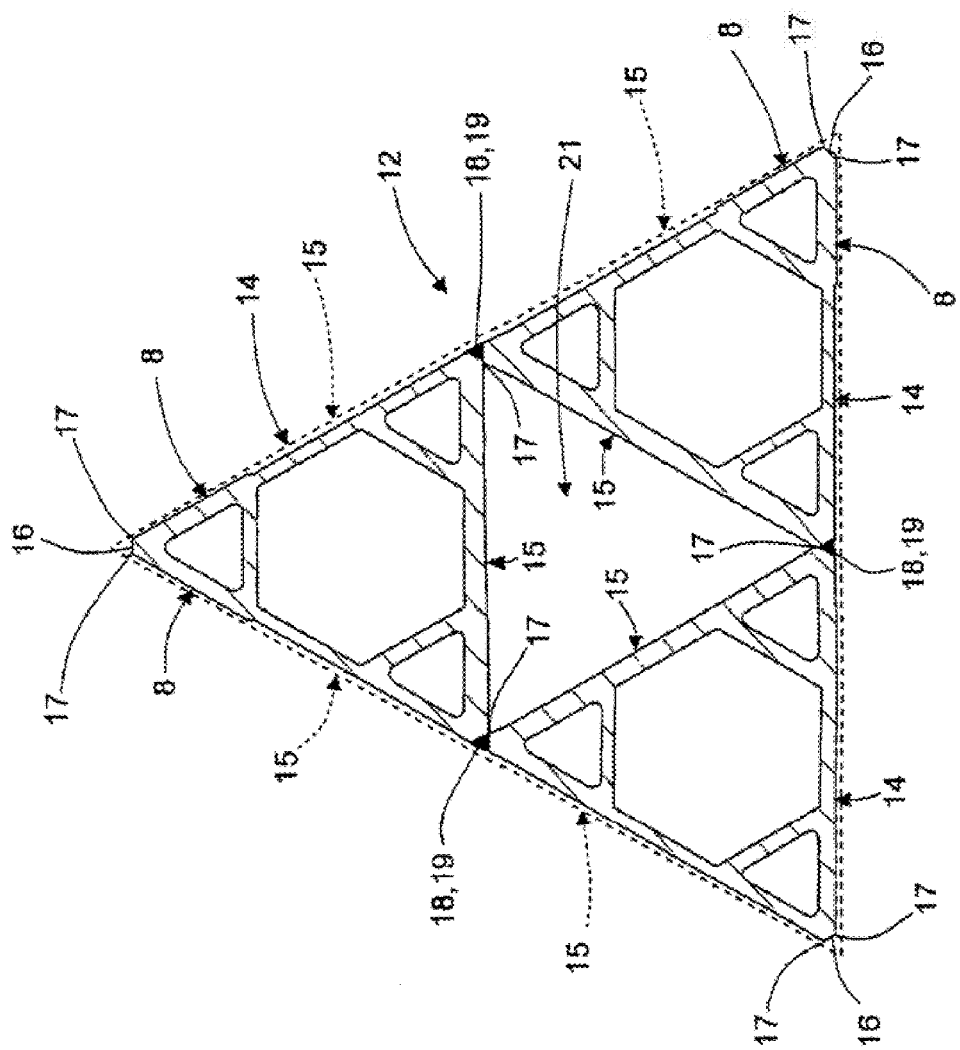
FIG. 2 is a section of the beam of the invention, at an enlarged scale.

With reference to FIG. 2, the beam 12 has a cross section shaped like an equilateral triangle, with chamfered edges. The beam 12 is formed by three beam elements 14, having a cross section shaped like an equilateral triangle with chamfered edges, which extend longitudinally throughout the length of the beam 12 and, in cross section, each form a portion thereof. The elements 14 are hollow and conveniently obtained by means of extrusion, preferably of aluminium alloy.

More in particular, each element 14 has three main faces 15, intercalated with chamfers 16 of a width much smaller than the main sides and forming edges 17 with the faces 15.

The elements 14 are set alongside one another so that the edges 17 adjacent to one of the faces 15 of each element 14, facing the inside of the beam 12, mate with respective edges 17 of the other two elements 14. Each face of the beam 12 is consequently defined by respective faces 15 of two different elements 14, set alongside, and coplanar with, one another, between which the chamfers 16 of the respective elements 14 form a median recess 18 with triangular cross section. The elements 14 are joined to one another by means of continuous welds 19 along the recesses 18, which receive the weld material of the welds. Since the elements 14 mate in twos exclusively along an edge 17 that defines the bottom of a respective recess 18, the welds 19 are through welds so as to ensure homogeneous and controlled characteristics.

The three elements 14 form between them an internal cavity 21 of the beam 16, with cross section shaped like an equilateral triangle, which, together with the hollow structure of the elements 14, bestows upon the beam 12 a particularly light but at the same time very rigid structure.

Once the welds 19 have been made, the (rough) beam 12 thus obtained, the overall dimensions of which are indicated by a dashed line in FIG. 2, is subjected to a rough machining of the faces, during which the weld material in excess is removed, and longitudinal areas are left in relief, designed to constitute the guides 8 for the carriage 9. Said areas are then subjected to a machining of finishing, for example micromilling or grinding, in order to obtain the necessary dimensional precision and level of finish. The guides 8 are finally subjected to a thermal treatment of surface hardening.

Finally, it is clear that modifications and variations can be made to the beam 12 described herein, without thereby departing from the sphere of protection represented by the annexed claims.

In particular, the shape and the number of the elements 14 making up the beam 12 may undergo change.

The invention claimed is:

1. A beam of a measuring machine, the beam comprising a plurality of beam elements having the same cross section and each forming, in cross section, a part of the cross section of said beam, said beam elements being set alongside one another and welded together so as to form as a whole said beam, wherein each face of said beam is defined by respective faces of two different beam elements set alongside, and coplanar with, one another, and wherein said beam elements delimit a central cavity of said beam, characterized in that said beam has a cross section substantially shaped like an equilateral triangle.

2. The beam according to claim 1, characterized in that each of said beam elements has three main faces, intercalated with chamfers of width much smaller than the main faces and forming, each, respective edges with the main faces adjacent thereto.

3. The beam according to claim 2, characterized in that said beam elements are set alongside one another so that the edges adjacent to one of the faces of each beam element facing the inside of the beam mate with respective edges of the other two beam elements.

4. The beam according to claim 3 wherein the chamfers of the respective beam elements defining each face of the beam form a median recess of said face with triangular cross section, said beam elements being joined to one another by means of continuous welds along said recesses, which receive the weld material of the welds.

5. A beam of a measuring machine, the beam comprising a plurality of beam elements having the same cross section and each forming, in cross section, a part of the cross section of said beam, said beam elements being set alongside one another and welded together so as to form as a whole said beam, wherein said beam has a cross section substantially shaped as an equilateral triangle and each face of said beam is defined by respective faces of two different beam elements set alongside, and coplanar with, one another, said beam elements being welded to one another at edges thereof.

* * * * *